US012558870B2

(12) United States Patent
Kato et al.

(10) Patent No.: US 12,558,870 B2
(45) Date of Patent: Feb. 24, 2026

(54) OPTICAL LAMINATE AND ARTICLE

(71) Applicant: DEXERIALS CORPORATION, Tochigi (JP)

(72) Inventors: Yuji Kato, Shimotsuke (JP); Kaori Tezuka, Shimotsuke (JP); Tadaaki Toyoshima, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 682 days.

(21) Appl. No.: 17/597,216

(22) PCT Filed: Mar. 19, 2021

(86) PCT No.: PCT/JP2021/011337
§ 371 (c)(1),
(2) Date: Dec. 29, 2021

(87) PCT Pub. No.: WO2021/193416
PCT Pub. Date: Sep. 30, 2021

(65) Prior Publication Data
US 2022/0244429 A1      Aug. 4, 2022

(30) Foreign Application Priority Data

Mar. 23, 2020  (JP) ................................ 2020-051220
Mar. 17, 2021  (JP) ................................ 2021-043915

(51) Int. Cl.
*B32B 7/023*       (2019.01)
*G02B 1/115*       (2015.01)
*G02B 1/14*        (2015.01)

(52) U.S. Cl.
CPC .............. *B32B 7/023* (2019.01); *G02B 1/115* (2013.01); *G02B 1/14* (2015.01)

(58) Field of Classification Search
CPC ............ B32B 7/023; G02B 1/115; G02B 1/14
(Continued)

(56) References Cited

U.S. PATENT DOCUMENTS

2004/0005482 A1*  1/2004  Kobayashi ............. G02B 1/115
                                                     428/701
2005/0207016 A1*  9/2005  Ando ...................... G02B 1/111
                                                     359/586
(Continued)

FOREIGN PATENT DOCUMENTS

CN        1673778       9/2005
CN        104204864      12/2014
(Continued)

OTHER PUBLICATIONS

Thorlabs webpage "Optical Coatings" https://www.thorlabs.com/newgrouppage9.cfm?objectgroup_id=5840#:~:text=These%20coatings%20are%20formed%20by,the%20filter%20can%20be%20altered (Year: 2020).*
(Continued)

*Primary Examiner* — George G. King
(74) *Attorney, Agent, or Firm* — Schwegman Lundberg & Woessner, P.A.

(57) ABSTRACT
In this optical laminate, a transparent substrate, a hard coat layer and an anti-reflective layer are laminated in that order, the anti-reflective layer is a laminate having low refractive index material layers and high refractive index material layers laminated in an alternating arrangement, the a* value and the b* value of reflected light, when light with a wavelength of 380 nm to 780 nm is incident upon the optical laminate, satisfy (condition A) to (condition C) and (condition E), and the anti-reflective layer is a sputtered layer.

11 Claims, 5 Drawing Sheets

(58) Field of Classification Search
USPC ......................................................... 359/586
See application file for complete search history.

(56) References Cited

U.S. PATENT DOCUMENTS

| | | | | |
|---|---|---|---|---|
| 2008/0002260 A1* | 1/2008 | Arrouy | .................... | C23C 14/08 |
| | | | | 359/359 |
| 2009/0052041 A1* | 2/2009 | Watanabe | .......... | G02B 27/0006 |
| | | | | 359/586 |
| 2012/0135216 A1* | 5/2012 | Kwon | .................... | B82Y 30/00 |
| | | | | 977/773 |
| 2015/0323705 A1 | 11/2015 | Hart et al. | | |
| 2015/0369966 A1 | 12/2015 | Kishi et al. | | |
| 2016/0340550 A1* | 11/2016 | Tsukamoto | ............ | C08G 77/08 |
| 2019/0227195 A1* | 7/2019 | Horio | ........................ | G02B 5/22 |
| 2019/0383971 A1 | 12/2019 | Tachibana et al. | | |

FOREIGN PATENT DOCUMENTS

| | | | |
|---|---|---|---|
| CN | 104813198 | | 7/2015 |
| CN | 104969094 | | 10/2015 |
| CN | 107735697 | | 2/2018 |
| EP | 4254022 | | 10/2023 |
| JP | 2014167621 | A | 9/2014 |
| JP | 2016177183 | | 10/2016 |
| JP | 2016177186 | | 10/2016 |
| JP | 2018536177 | A | 12/2018 |
| JP | 2019028364 | A | 2/2019 |
| JP | 2019070756 | A | 5/2019 |
| JP | 2019215458 | A | 12/2019 |
| TW | 201809730 | | 3/2018 |
| TW | 202003252 | | 1/2020 |
| TW | I787766 | | 12/2022 |
| WO | WO-2013140811 | A1 | 9/2013 |
| WO | 2015000534 | | 1/2015 |
| WO | WO-2017048700 | A1 | 3/2017 |
| WO | WO-2019169293 | A1 | 9/2019 |

OTHER PUBLICATIONS

"International Application Serial No. PCT/JP2021/011337, International Search Report dated Jun. 8, 2021", w/ English Translation, (Jun. 8, 2021), 5 pgs.

"Japanese Application Serial No. 2020-051220, Office Action dated Sep. 1, 2020", w/English Translation, (Sep. 1, 2020), 9 pgs.

"European Application No. 21774108.1, Search and Examination Report dated Mar. 21, 2024", (Mar. 21, 2024), 8 pgs.

"Taiwanese Application No. 112102731, Office Action dated May 20, 2024", w English Translation, (May 20, 2024), 11 pgs.

"Chinese Application Serial No. 202180002823.6, Office Action dated Mar. 30, 2022", w English Translation, (Mar. 30, 2022), 9 pgs.

"International Application Serial No. PCT JP2021 011337, Written Opinion dated Jun. 8, 2021", w English Translation, (Jun. 8, 2021), 7 pgs.

"Taiwanese Application No. 114107424, Office Action dated Sep. 18, 2025", w English Translation, Sep. 18, 2025, 5 pgs.

"Chinese Application No. 202211244870.4, Office Action dated May 19, 2025", w English Translation, (May 19, 2025), 11 pgs.

* cited by examiner

OPTICAL LAMINATE AND ARTICLE

PRIORITY APPLICATIONS

This application is a U.S. National Stage Filing under 35 U.S.C. § 371 from International Application No. PCT/JP2021/011337, filed on Mar. 19, 2021, and published as WO2021/193416 on Sep. 30, 2021, which claims the benefit of priority to Japanese Application No. 2021-043915, filed on Mar. 17, 2021 and to Japanese Application No. 2020-051220, filed on Mar. 23, 2020; the benefit of priority of each of which is hereby claimed herein, and which applications and publication are hereby incorporated herein by reference in their entireties.

TECHNICAL FIELD

The present invention relates to an optical laminate and an article.

BACKGROUND ART

Image display devices such as flat panel displays (FPD) are widely used in mobile telephones, smart phones, and car navigation devices and the like.

In conventional image display devices, it is desirable to suppress any color irregularity caused by viewing angle. Color irregularity is a phenomenon in which the color (chromaticity) appears different depending on the viewing angle.

For example, Patent Document 1 discloses an anti-reflective film for which the luminous reflectance when a light A with a wavelength of 380 nm to 780 nm from a standard light source D65 is incident upon the film at an incident angle of 5° is not more than 0.5%, and for which regular reflection light generated when the incident angle of the light A on the film is varied within a range from 5° to 50° exhibits a ratio of the difference between the maximum value and the minimum value of the b* value in the CIE-Lab color system relative to the difference between the maximum value and the minimum value of the a* value in the CIE-Lab color system (difference of b* value/difference of a* value) that is 2 or greater.

PRIOR ART LITERATURE

Patent Document

Patent Document 1: Japanese Unexamined Patent Application, First Publication No. 2019-28364

SUMMARY OF INVENTION

Problems to be Solved by the Invention

Optical laminates such as anti-reflective films installed on image display devices preferably cause little coloration of reflected light reflected by the image display device on which the optical laminate is installed. Further, it is preferable that optical laminates cause no visible color irregularities even when the viewing angle is altered for the image display device on which the optical laminate is installed.

However, with conventional optical laminates, color irregularities have sometimes been visible when the viewing angle is changed for the image display device on which the optical laminate is installed.

Accordingly, for conventional optical laminates installed on image display devices, it would be desirable to suppress coloration of reflected light reflected by the image display device, and suppress color irregularities when the viewing angle for the image display device is altered.

The present invention has been developed in light of the above circumstances, and has an object of providing an optical laminate which is provided on an article, causes little coloration of reflected light reflected by the article, and suppresses color irregularities when the viewing angle of the article is altered.

Further, the present invention also has an object of providing an article that includes the optical laminate of the present invention, suppresses coloration of reflected light, and exhibits little color irregularity when the viewing angle is altered.

Means for Solving the Problems

In order to achieve the above objects, this invention proposes the following aspects.

[1]

An optical laminate containing a transparent substrate, a hard coat layer and an anti-reflective layer laminated in that order, wherein the anti-reflective layer is a laminate having a low refractive index material layer and a high refractive index material layer formed from a material with a higher refractive index than the low refractive index material layer laminated in an alternating arrangement, and when a light with a wavelength of 380 nm to 780 nm from a standard light source D65 is incident upon the optical laminate, the a* value and the b* value in the CIE-Lab color system of the reflected light satisfy (condition A) to (condition C) and (condition E) described below.

(Condition A) When the light is incident at an incident angle of 30° to 40° relative to the surface of the optical laminate, the a* value and the b* value of the reflected light each have an absolute value of not more than 3.

(Condition B) When the light is incident at incident angles of 5°, 10°, 20° and 30° relative to the surface of the optical laminate, the a* values and the b* values of the reflected light satisfy formula (B1) shown below.

$$\{\text{maximum value of } (|a^*|/|b^*|)\}-\{\text{minimum value of } (|a^*|/|b^*|)\}<1.0 \tag{B1}$$

(Condition C) When the light is incident at an incident angle of 5° relative to the surface of the optical laminate, one or both of the a* value and the b* value of the reflected light have an absolute value of 5 or greater, and the a* value and the b* value have absolute values of not more than 15.

(Condition E) When the light is incident at an incident angle of 5° to 25°, the a* value and the b* value in the CIE-Lab color system of the reflected light are within the same quadrant in the a*b* plane.

[2] The optical laminate according to [1], wherein when the light is incident upon the optical laminate, the a* value and the b* value in the CIE-Lab color system of the reflected light satisfy (condition D) shown below.

(Condition D) When the light is incident at incident angles of 5°, 10°, 20°, 30° and 40° relative to the surface of the optical laminate, the a* values and the b* values of the reflected light satisfy formula (D1) shown below.

$$\{\text{maximum value of } (|a^*|/|b^*|)\}-\{\text{minimum value of } (|a^*|/|b^*|)\}<1.5 \tag{D1}$$

[3] The optical laminate according to [2], wherein in (condition D), when the light is incident at incident angles of 5°, 10°, 20°, 30° and 40° relative to the surface of the optical laminate, the a* values and the b* values of the reflected light satisfy formula (D2) shown below.

$$\{\text{maximum value of } (|a^*|/|b^*|)\} - \{\text{minimum value of } (|a^*|/|b^*|)\} < 1.0 \tag{D2}$$

[4] The optical laminate according to [2], wherein in (condition D), when the light is incident at incident angles of 5°, 10°, 20°, 30° and 40° relative to the surface of the optical laminate, the a* values and the b* values of the reflected light satisfy formula (D3) shown below.

$$\{\text{maximum value of } (|a^*|/|b^*|)\} - \{\text{minimum value of } (|a^*|/|b^*|)\} < 0.1 \tag{D3}$$

[5] The optical laminate according to any one of [1] to [4], wherein the low refractive index material layer contains a Si oxide, and the high refractive index material layer is formed from $Nb_2O_5$.

[6] The optical laminate according to [5], wherein the low refractive index material layer and the high refractive index material layer are formed by a sputtering method.

[7] The optical laminate according to any one of [1] to [6], wherein an antifouling layer is laminated to the surface of the anti-reflective layer on the opposite side from the hard coat layer.

[8] The optical laminate according to [7], wherein the antifouling layer contains a fluorine-based compound, and is formed by a vapor deposition method or a coating method.

[9] An article provided with the optical laminate according to any one of [1] to [8].

[10] The article according to [9], wherein the optical laminate is provided on the surface of an image display device.

Effects of the Invention

In the optical laminate of the present invention, as a result of the synergistic effect obtained by ensuring that the a* value and the b* value in the CIE-Lab color system of the reflected light, when light with a wavelength of 380 nm to 780 nm from a standard light source D65 is incident upon the optical laminate, satisfy the condition (A) to condition (C) and (condition E) described above, when the optical laminate is provided on an article, reflected light reflected from the article is resistant to coloration, and color irregularity is unlikely to be visible even when the viewing angle of the article is altered.

Further, an article of the present invention is provided with the optical laminate of the present invention, and therefore reflected light from the article is resistant to coloration, and color irregularity is unlikely to be visible even when the viewing angle is altered.

EMBODIMENTS FOR CARRYING OUT THE INVENTION

Figure 1:
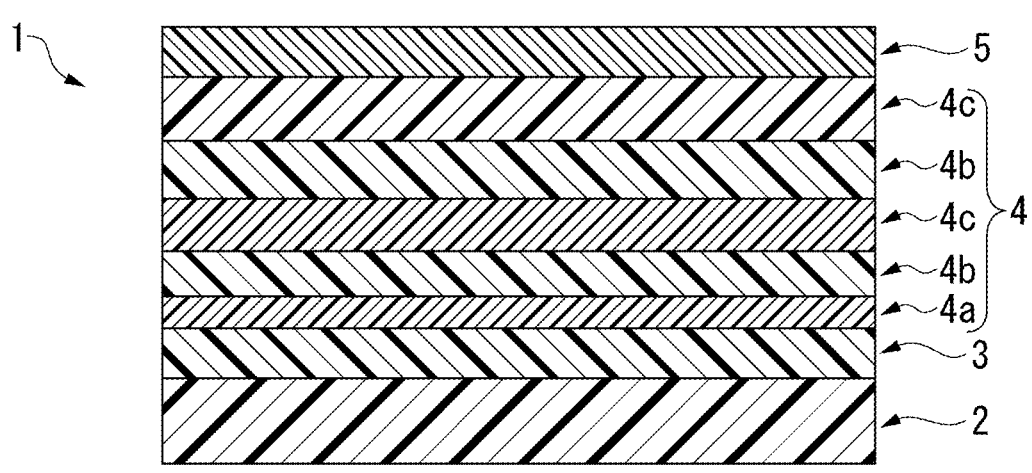
FIG. 1 is a cross-sectional schematic view illustrating one example of an optical laminate of the present invention.

In order to achieve the objects described above, the inventors of the present invention conducted intensive research as described below.

In order to obtain an optical laminate which, when provided on an article, suppressed coloration of reflected light reflected from the article, and suppressed color irregularities even when the viewing angle of the article was altered, the inventors of the present invention focused their attention on the relationship between the article viewing angle and the chromaticity (saturation and hue) of the reflected light, and conducted intensive research of this relationship.

As a result, they discovered that even if the saturation of the reflected light is sufficiently low when light is incident at a small incident angle of 5° or less relative to the surface, if the saturation of the reflected light is high when light is incident at an incident angle of 30° to 40°, then color irregularities caused by changes in the viewing angle of the article are more likely to be visible. Accordingly, the inventors discovered that in order to suppress color irregularities caused by changes in the viewing angle of the article, reducing the saturation of the reflected light when light is incident at an incident angle of 30° to 40° relative to the surface is an important factor.

Further, the inventors of the present invention also discovered that the likelihood of color irregularities being visible is affected not only by the saturation of the reflected light, but is also significantly affected by hue changes in the reflected light caused by changes in the viewing angle. As a result, the inventors discovered that by sufficiently reducing the saturation of the reflected light when light is incident at an incident angle of 30° to 40° relative to the surface, and reducing the hue changes in the reflected light when light is incident at an incident angle within a range from 5° to 30°, color irregularities are less likely to be visible even if the viewing angle of the article is altered.

Moreover, the inventors of the present invention also discovered that when the saturation of the reflected light when light is incident at an incident angle of 30° to 40° relative to the surface, and the hue change in the reflected light when light is incident at an incident angle within a range from 5° to 30° were both reduced satisfactorily, coloration of the reflected light reflected from the article was unlikely to be visible, even if the saturation of the reflected light when light was incident at an incident angle of 5° was higher than that when light was incident at an incident angle of 30° to 40°.

In addition, based on the findings outlined above, the inventors conducted various investigations into the chromaticity range of the reflected light when light is incident at an incident angle of 30° to 40° relative to the surface, and when light is incident at an incident angle of 5°, and also into hue changes in the reflected light when light is incident at an incident angle within a range from 5° to 30° relative to the surface.

As a result, they discovered that optical laminates for which the a* value and the b* value in the CIE-Lab color system of the reflected light, when a light with a wavelength of 380 nm to 780 nm from a standard light source D65 is incident upon the optical laminate, satisfy (condition A) to (condition C) described below were favorable. The inventors confirmed that these types of optical laminates suppressed coloration of the reflected light reflected from the article, and suppressed color irregularities when the viewing angle for the article is altered, enabling them to complete the present invention. Moreover, they also discovered that if (condition E) described below is satisfied, then an even more superior optical laminate is obtained.

(Condition A) When the light is incident at an incident angle of 30° to 40° relative to the surface of the optical laminate, the a* value and the b* value of the reflected light each have an absolute value of not more than 3.

(Condition B) When the light is incident at incident angles of 5°, 10°, 20° and 30° relative to the surface of the optical laminate, the a* values and the b* values of the reflected light satisfy formula (B1) shown below.

$$\{\text{maximum value of } (|a^*|/|b^*|)\}-\{\text{minimum value of } (|a^*|/|b^*|)\}<1.0 \tag{B1}$$

(Condition C) When the light is incident at an incident angle of 5° relative to the surface of the optical laminate, one or both of the a* value and the b* value of the reflected light have an absolute value of 5 or greater, and the a* value and the b* value have absolute values of not more than 15.

(Condition E) When the light is incident at an incident angle of 5° to 25°, the a* value and the b* value in the CIE-Lab color system of the reflected light are within the same quadrant in the a*b* plane.

The optical laminate and article of the present invention are described below in detail with appropriate reference to the drawings. The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

[Optical Laminate]

FIG. 1 is a cross-sectional schematic view illustrating one example of the optical laminate of the present invention.

The optical laminate 1 illustrated in FIG. 1 has a transparent substrate 2, a hard coat layer 3, an anti-reflective layer 4 (a laminate), and an antifouling layer 5 laminated in that order.

The optical laminate illustrated in FIG. 1 is provided on an article (not shown in the drawing). Examples of the article include an article composed of the optical laminate 1 provided on the surface of an image display device (not shown in the drawing).

Figure 2:
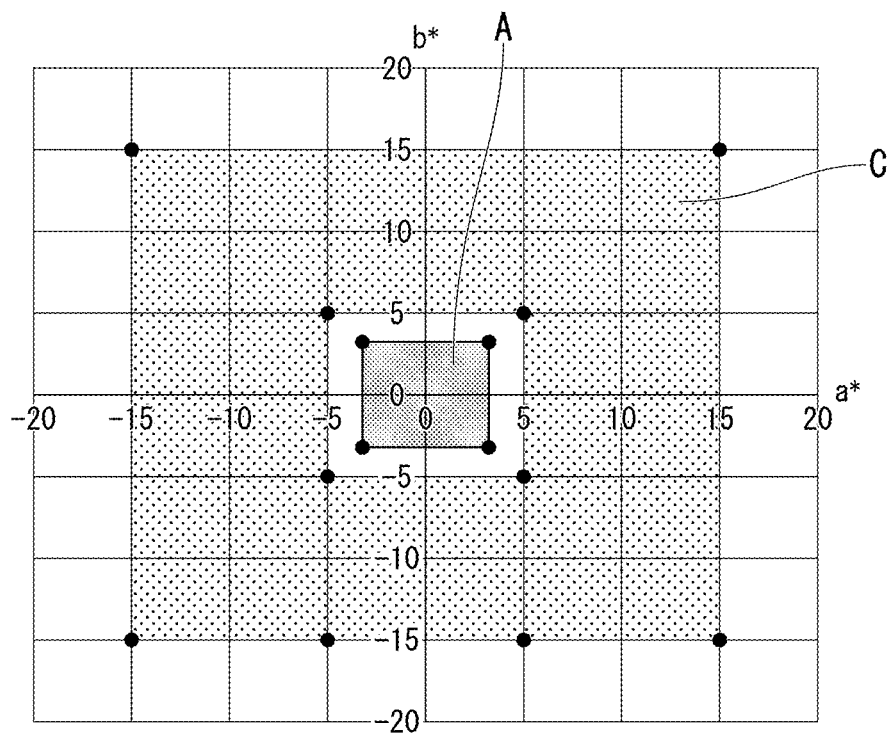
FIG. 2 is a diagram which uses an L*a*b* color space chromaticity diagram to describe the a* value and the b* value in the CIE-Lab color system of reflected light when light with a wavelength of 380 nm to 780 nm from a standard light source D65 is incident upon the optical laminate illustrated in FIG. 1.

FIG. 2 is a diagram for describing the a* value and the b* value in the CIE-Lab color system of reflected light when light with a wavelength of 380 nm to 780 nm from a standard light source D65 is incident upon the optical laminate illustrated in FIG. 1. In FIG. 2, the a* value and b* value indicate the chromaticity, and colors with coordinates having larger absolute values for the a* value and the b* value represent colors of higher saturation. In other words, in FIG. 2, colors with coordinates having larger absolute values for the a* value and the b* value are more vivid colors, whereas colors with coordinates having smaller absolute values for the a* value and the b* value are colors closer to achromatic colors.

Typically, +a* coordinates indicate hues in the red direction, −a* coordinates indicate hues in the green direction, +b* coordinates indicate hues in the yellow direction, and −b* coordinates indicate hues in the blue direction. In the L*a*b* chromaticity diagram of FIG. 2, the hues within the first quadrant (+a*, +b*), the second quadrant (−a*, +b*), the third quadrant (−a*, −b*), and the fourth quadrant (+a*, −b*) correspond respectively with red~orange~yellow, yellow-~yellow-green~green, green~blue-green~blue, and blue~violet~red. Accordingly, when the hue of the reflected light changes to a different quadrant (namely, when a quadrant shift occurs) depending on the incident angle, a large change in the hue occurs, and color irregularities are more likely to be visible. It is preferable that the hue of the reflected light undergoes no quadrant change as a result of the incident angle, namely, that the hue of the reflected light remains within the same quadrant regardless of the incident angle.

With the optical laminate 1 illustrated in FIG. 1, the a* value and the b* value in the CIE-Lab color system of the reflected light, when light with a wavelength of 380 nm to 780 nm from a standard light source D65 is incident upon the optical laminate, satisfy (condition A) to (condition C) described above. Each of the conditions among (condition A) to (condition C) can be adjusted by appropriate selection of the material and the thickness of each layer among the transparent substrate 2, the hard coat layer 3, the anti-reflective layer 4 and the antifouling layer 5 that form the optical laminate 1.

For the optical laminate 1 illustrated in FIG. 1, the a* value and the b* value of the reflected light, when light is incident at an incident angle of 30° to 40° relative to the surface of the optical laminate 1, each have an absolute value of not more than 3 (in FIG. 2, a value within the region indicated by reference sign A) (condition A). Accordingly, for the optical laminate 1 of the present embodiment, the saturation of the reflected light when light is incident at an incident angle of 30° to 40° is satisfactorily low, and color irregularities caused by a change in the viewing angle of the article are unlikely to be visible. The a* value and the b* value described above each preferably has an absolute value of 2.5 or less. In such cases, an optical laminate 1 is obtained for which color irregularities caused by a change in the viewing angle of the article are even less likely to be visible. If one or both of the above a* value and b* value have an absolute value exceeding 3, then the saturation of the reflected light, when light is incident at an incident angle of 30° to 40°, increases, and color irregularities caused by a change in the viewing angle of the article are more likely to be visible.

For the optical laminate 1 illustrated in FIG. 1, the a* values and the b* values of the reflected light, when light is incident at incident angles of 5°, 10°, 20° and 30° relative to the surface of the optical laminate 1, satisfy formula (B1) shown below (condition B).

$$\{\text{maximum value of } (|a^*|/|b^*|)\}-\{\text{minimum value of } (|a^*|/|b^*|)\}<1.0 \tag{B1}$$

The value of |a*|/|b*| is a numerical value that corresponds with the hue of the reflected light. An optical laminate 1 which satisfies formula (B1), in which the difference between the maximum value and minimum value for the above |a*|/|b*| is less than 1.0, exhibits only a small hue change in the reflected light when light is incident at incident angles from 5° to 30°. In other words, the reflected light has a similar hue when light is incident at incident angles from 5° to 30°. Consequently, the optical laminate 1 of the present embodiment exhibits little hue change in the reflected light as a result of changes in the viewing angle of the article, and color irregularities are unlikely to be visible. In contrast, if the optical laminate 1 does not satisfy the above (condition B), the hue change in the reflected light as a result of changes in the viewing angle of the article tends to be large, and color irregularities are more likely to be visible. The difference between the maximum value and minimum value for the above |a*|/|b*| is preferably not more than 0.5, and more preferably 0.3 or less.

In order to satisfy the above (condition A) and (condition B), the optical laminate 1 of the present embodiment should exhibit a satisfactory low saturation of the reflected light when light is incident at an incident angle of 30° to 40° (in FIG. 2, saturation within the region indicated by reference sign A), and have a satisfactorily small hue change in the reflected light when light is incident at incident angles of 5 to 30° (satisfying formula (B1)). The chromaticity (saturation and hue) of the reflected light from the optical laminate 1 changes continuously as the viewing angle of the article is altered. Accordingly, for an optical laminate 1 that satisfies the above (condition A) and (condition B), for example, reflected light, when light is continuously incident at incident angles of 5 to 30°, will have a similar hue, and the saturation will tend to decrease as the incident angle increases. For the optical laminate 1 of the present embodiment, because the saturation of the reflected light, when light is incident at an incident angle of 30° to 40°, is sufficiently small (condition A), even if the hue of the reflected light when the incident angle is from 30° to 40° differs from that when the incident angle is from 5° to 30°, color irregularities are unlikely to be visible. Accordingly, for the optical laminate 1 of the present embodiment, color irregularities caused by changes in the viewing angle of the article are unlikely.

For the optical laminate 1 illustrated in FIG. 1, when the light is incident at an incident angle of 5° relative to the surface of the optical laminate 1, one or both of the a* value and the b* value of the reflected light have an absolute value of 5 or greater, and the a* value and the b* value have absolute values of not more than 15 (condition C). In FIG. 2, the reference sign C indicates the region for which the absolute values of the a* value and the b* value are at least 5 but not more than 15.

For the optical laminate 1 of the present embodiment, because the above a* value and b* value have absolute values of not more than 15, coloration of the reflected light from the article is unlikely to be visible. The a* value and the b* value preferably each have an absolute value of 10 or less. In such cases, an optical laminate 1 is obtained for which coloration of the reflected light from the article is even less likely to be visible.

Because the optical laminate 1 of the present embodiment satisfies the above (condition A) and (condition B), even if the saturation of the reflected light, when light is incident at an incident angle of 5°, is outside that when light is incident at an incident angle of 30° to 40° (namely, outside the region indicated by reference sign A in FIG. 2) (for example, in FIG. 2, within the region indicated by reference sign C), coloration of the reflected light reflected from the article is unlikely to be visible. However, if one or both of the above a* value and b* value have an absolute value exceeding 15, then because the saturation of the reflected light, when light is incident at an incident angle of 5°, is high, coloration of the reflected light reflected from the article is more likely to be visible.

Further, for the optical laminate 1 illustrated in FIG. 1, one or both of the a* value and the b* value of the reflected light, when light is incident at an incident angle of 5° relative to the surface of the optical laminate 1, have an absolute value of 5 or greater. (condition C). Consequently, compared with cases where, for example, the a* value and b* value of the reflected light, when light is incident at an incident angle of 5°, are each less than 3 (within the region indicated by reference sign A in FIG. 2), the number of options available for the material, thickness and production method used for each layer that forms the optical laminate 1 increase, enabling production to be conducted more easily and efficiently. Moreover, one or both of the above a* value and b* value may have an absolute value of 8 or greater. In such cases, the number of options available for the material, thickness and production method used for each layer that forms the optical laminate 1 increase even further, meaning production can be conducted even more easily and efficiently.

Moreover, for the optical laminate 1 illustrated in FIG. 1, the a* value and the b* value in the CIE-Lab color system of the reflected light, when light is incident at an incident angle of 5° to 25° relative to the surface of the optical laminate 1, are within the same quadrant in the a*b* plane (in the La*b* chromaticity diagram) (condition E).

Accordingly, when a display device provided with an optical laminate of the present invention is, for example, provided in the center console or the like of an automobile, or provided in the ceiling forward of a rear seat, there is little hue change when viewed from the rear seat, making the optical laminate ideal for these types of applications.

For the optical laminate 1 illustrated in FIG. 1, the a* values and the b* values of the reflected light, when the light is incident at incident angles of 5°, 10°, 20°, 30° and 40° relative to the surface of the optical laminate 1, preferably satisfy formula (D1) shown below (condition D).

$$\{\text{maximum value of } (|a^*|/|b^*|)\} - \{\text{minimum value of} \\ (|a^*|/|b^*|)\} < 1.5 \tag{D1}$$

An optical laminate 1 that satisfies formula (D1), in which the difference between the maximum value and minimum value for the above |a*|/|b*| is less than 1.5, exhibits only a small hue change in the reflected light when light is incident at incident angles from 5° to 40°. In other words, the reflected light has a similar hue when light is incident at incident angles from 5° to 40°. Consequently, the optical laminate 1 of this embodiment exhibits little hue change in the reflected light as a result of changes in the viewing angle of the article, and color irregularities are even less likely to be visible.

The a* values and the b* values of the reflected light, when light is incident at incident angles of 5°, 10°, 20°, 30° and 40° relative to the surface of the optical laminate 1, preferably satisfy formula (D2) shown below, and even more preferably satisfy formula (D3) shown below. When the optical laminate 1 satisfies formula (D2) or formula (D3), hue change in the reflected light as a result of changes in the viewing angle of the article becomes even less, and an optical laminate 1 is obtained for which color irregularities caused by a change in the viewing angle of the article are even less likely to be visible.

$$\{\text{maximum value of } (|a^*|/|b^*|)\} - \{\text{minimum value of} \\ (|a^*|/|b^*|)\} < 1.0 \tag{D2}$$

$$\{\text{maximum value of } (|a^*|/|b^*|)\} - \{\text{minimum value of} \\ (|a^*|/|b^*|)\} < 0.1 \tag{D3}$$

(Transparent Substrate)

A conventional transparent substrate may be used as the transparent substrate 2 used in forming the optical laminate 1 illustrated in FIG. 1.

The transparent substrate 2 is formed from a transparent material that allows transmission of light in the visible light region. In embodiments of the present invention, the term "transparent material" means a material for which the transmittance of light in the visible light region is 80% or higher.

For example, a plastic film may be used as the transparent substrate 2. Examples of the material for the plastic film include polyester-based resins, acetate-based resins, polyethersulfone-based resins, polycarbonate-based resins, polyamide-based resins, polyimide-based resins, polyolefin-based resins, (meth)acrylic-based resins, polyvinyl chloride-based resins, polyvinylidene chloride-based resins, polysty-rene-based resins, polyvinyl alcohol-based resins, polyarylate-based resins, and polyphenylene sulfide-based resins. Among these resins, the use of one or more resins selected from among polyester-based resins, acetate-based resins, polycarbonate-based resins and polyolefin-based resins as the material for the plastic film is preferred, and the use of triacetyl cellulose (TAC) is particularly preferred.

Further, provided the optical characteristics are not impaired, the transparent substrate 2 may also contain a reinforcing material. Examples of the reinforcing material include cellulose nanofiber, and nanosilica and the like.

Furthermore, an inorganic material such as a glass film may also be used as the transparent substrate 2.

If necessary, a film imparted with an optical function and/or physical function may also be used as the transparent substrate 2. Examples of films having an optical function and/or physical function include polarizing films, phase difference compensation films, heat ray blocking films, conductive films, and brightness enhancing films. Moreover, a substrate prepared, for example, by imparting a function such as an antistatic function to a film having an optical function and/or physical function may also be used as the transparent substrate 2.

The thickness of the transparent substrate 2 is, for example, preferably at least 25 μm, and more preferably 40 μm or greater. Provided the thickness of the transparent substrate 2 is at least 25 μm, the occurrence of wrinkling is unlikely even if strain is applied to the optical laminate 1, which is desirable. Further, provided the thickness of the transparent substrate 2 is at least 25 μm, even when the hard coat layer 3 is formed on the transparent substrate 2 during production of the optical laminate 1, wrinkling of the transparent substrate 2 is unlikely, and production can be conducted with good yield. Furthermore, provided the thickness of the transparent substrate 2 is at least 25 μm, the optical laminate 1 is resistant to curling during the production of the optical laminate 1, and handling is easier, both of which are desirable.

The thickness of the transparent substrate 2 is, for example, preferably not more than 300 μm, and more preferably 250 μm or less. Provided the thickness of the transparent substrate 2 is not more than 300 μm, any adverse impact that the thickness of the transparent substrate 2 has upon ensuring a thin and lightweight optical laminate 1 can be prevented. Further, provided the thickness of the transparent substrate 2 is not more than 300 μm, the optical laminate 1 can be produced efficiently by using a transparent substrate 2 that has been wound into a roll-like form.

Furthermore, provided the thickness of the transparent substrate 2 is not more than 300 μm, production of water or organic matter from the transparent substrate 2 during formation of the hard coat layer 3 on the transparent substrate 2 is unlikely, and production can be conducted with good yield.

There are no particular limitations on the method used for producing the transparent substrate 2, and production may be conducted using a conventional method.

A transparent substrate that has been subjected to a surface treatment may be used as the transparent substrate 2. Examples of this surface treatment include etching treatments such as sputtering, corona discharge, ultraviolet irradiation, electron beam irradiation, chemical treatments and oxidation, as well as undercoat treatments. By subjecting the transparent substrate 2 to a surface treatment using one or more methods selected from among these surface treatments, a transparent substrate 2 that exhibits favorable adhesion with the hard coat layer 3 can be obtained.

Further, if necessary, the surface of the transparent substrate 2 may be cleaned prior to the formation of the hard coat layer 3 on the transparent substrate 2. Examples of methods that may be used for cleaning the surface of the transparent substrate 2 include solvent cleaning and ultrasonic cleaning. Cleaning the surface of the transparent substrate 2 enables dust to be removed from the surface of the transparent substrate 2, thus cleaning the surface, and is consequently preferred.

(Hard Coat Layer)

A conventional material may be used as the hard coat layer 3, and examples include materials containing a binder resin and a filler. In addition to the binder resin and the filler, if necessary, the hard coat layer 3 may also include other conventional materials such as leveling agents.

A transparent material is preferably used as the binder resin included in the hard coat layer 3. Examples of binder resins that may be used include ionizing radiation curable resins, thermoplastic resins, and thermosetting resins. A single binder resin may be used alone, or a mixture of two or more resins may be used.

Examples of ionizing radiation curable resins include ethyl (meth)acrylate, ethylhexyl (meth)acrylate, styrene, methylstyrene, n-vinylpyrrolidone, urethane acrylate, polyethylene glycol diacrylate, pentaerythritol triacrylate (PETA), dipentaerythritol hexaacrylate (DPHA), and pentaerythritol tetraacrylate (PETTA). Resins in which one of the above compounds has been modified with PO (propylene oxide), EO (ethylene oxide), or CL (caprolactone) or the like may also be used as the ionizing radiation curable resin.

In this description, the term "(meth)acrylate" means methacrylate and/or acrylate.

In those cases where an ionizing radiation curable resin is included as a binder resin, the hard coat layer 3 may also contain a conventional ionizing radiation curing initiator. For example, when an ultraviolet curable resin such as a (meth)acrylate is included as the ionizing radiation curable resin, an ultraviolet curing initiator such as hydroxycyclohexyl phenyl ketone is preferably included.

Examples of thermoplastic resins include styrene-based resins, (meth)acrylic-based resins, vinyl acetate-based resins, vinyl ether-based resins, halogen-containing resins, alicyclic olefin-based resins, polycarbonate-based resins, polyester-based resins, polyamide-based resins, cellulose derivatives, and silicone-based resins.

Examples of thermosetting resins include phenol resins, urea resins, diallyl phthalate resins, melamine resins, guanamine resins, unsaturated polyester resins, polyurethane resins, epoxy resins, aminoalkyd resins, melamine-urea co-condensation resins, silicone resins, and polysiloxane resins (including so-called silsesquioxanes such as basket-type and ladder-type silsesquioxanes).

From the viewpoints of glare prevention, adhesion with the anti-reflective layer 4 described below and anti-blocking properties, the filler included in the hard coat layer 3 may be selected from various options in accordance with the intended application of the optical laminate 1. Specifically, for example, conventional fillers such as silica (an oxide of Si) particles, alumina (aluminum oxide) particles, and organic fine particles may be used.

From the viewpoint of improving the glare prevention of the optical laminate 1, organic fine particles formed from an acrylic resin or the like are preferably used as the filler. The particle size of these organic fine particles is preferably not more than 10 µm, more preferably not more than 5 µm, and particularly preferably 3 µm or less.

From the viewpoint of improving the adhesion with the anti-reflective layer 4, silica particles are preferably used as the filler. The particle size of the silica particles is preferably not more than 800 nm, and particularly preferably 100 nm or less.

The thickness of the hard coat layer 3 is, for example, preferably at least 0.5 µm, and more preferably 1 µm or greater. The thickness of the hard coat layer 3 is preferably not more than 100 µm.

The hard coat layer 3 may be composed of a single layer, or may be composed of a plurality of laminated layers.

There are no particular limitations on the method used for producing the hard coat layer 3, and conventional production methods may be used. For example, the hard coat layer 3 may be produced by a coating method. Examples of the coating method include a method in which a coating liquid prepared by dissolving and/or dispersing the materials that constitute the hard coat layer 3 in a solvent is applied to the transparent substrate 2 using a conventional method and then cured. Conventional solvents may be used as the solvent, and may be selected appropriately in accordance with the materials that constitute the hard coat layer 3.

(Anti-Reflective Layer)

The anti-reflective layer 4 is formed from a laminate having low refractive index material layers 4a and 4c and high refractive index material layers 4b formed from a material with a higher refractive index than the low refractive index material layers 4a and 4c laminated in an alternating arrangement. The anti-reflective layer 4 diffuses light incident on the optical laminate 1 from the side of the antifouling layer 5. As a result, the optical laminate 1 functions as an anti-reflective film so that light incident on the optical laminate 1 from the side of the antifouling layer 5 is prevented from being emitted in one direction as reflected light.

Among the low refractive index material layers 4a and 4c that form the anti-reflective layer 4, the low refractive index material layer 4a positioned in contact with the hard coat layer 3 has a function as an adhesive layer for binding the anti-reflective layer 4 and the hard coat layer 3. Further, in the optical laminate 1 illustrated in FIG. 1, on the surface of the anti-reflective layer 4 on the opposite side from the hard coat layer 3, a low refractive index material layer 4c is positioned in contact with the antifouling layer 5.

In the present embodiment, as illustrated in FIG. 1, the anti-reflective layer 4 is described using an example in which the anti-reflective layer 4 is composed of a laminate in which 5 layers, namely, the low refractive index material layer 4a, a high refractive index material layer 4b, a low refractive index material layer 4c, a high refractive index material layer 4b and a low refractive index material layer 4c, are laminated in that order from the side of the hard coat layer 3. The plurality of layers including the low refractive index material layers 4a and 4c and the high refractive index material layers 4b that form the anti-reflective layer 4 is not limited to 5 layers, any may also be less than 5 layers or more than 5 layers, with the number of layers being determined appropriately in accordance with the optical characteristics required of the anti-reflective layer 4.

In those cases where the laminate that forms the anti-reflective layer 4 includes two or more of the low refractive index material layers 4a and 4c, the plurality of low refractive index material layers 4a and 4c may all be layers having the same refractive index, or a portion or all of the layers may have different refractive indices.

In those cases where the laminate that forms the anti-reflective layer 4 includes two or more of the high refractive index material layers 4b, the plurality of high refractive index material layers 4b may all be layers having the same refractive index, or a portion or all of the layers may have different refractive indices.

The refractive index of the low refractive index material layers 4a and 4c is preferably within a range from 1.20 to 1.60, and more preferably from 1.30 to 1.50.

The low refractive index material layers 4a and 4c preferably contain $SiO_2$ (Si oxide) as the main component. The low refractive index material layers 4a and 4c may be composed solely of Si oxide, or may also include another element in an amount of not more than 50% by mass, and preferably 10% by mass or less. Examples of other elements that may be incorporated include Na, which may be included to increase the durability of the low refractive index material layers 4a and 4c, and one or more elements selected from among Zr, Al and N, which may be included to increase the hardness of the low refractive index material layers 4a and 4c.

The refractive index of the high refractive index material layers 4b is preferably within a range from 2.00 to 2.60, and more preferably from 2.10 to 2.45.

Examples of the high refractive index material layers 4b include layers formed from niobium pentoxide ($Nb_2O_5$, refractive index: 2.33), titanium oxide ($TiO_2$, refractive index: 2.33 to 2.55), tungsten oxide ($WO_3$, refractive index: 2.2), cerium oxide ($CeO_2$, refractive index: 2.2), tantalum pentoxide ($Ta_2O_5$, refractive index: 2.16), zinc oxide (ZnO, refractive index: 2.1), and indium tin oxide (ITO, refractive index: 2.06), and layers formed from niobium pentoxide are preferred.

The thicknesses of the low refractive index material layers 4a and 4c and the high refractive index material layers 4b that constitute the anti-reflective layer 4 may be determined appropriately in accordance with the optical characteristics required of the anti-reflective layer 4. The thicknesses of the low refractive index material layers 4a and 4c and the high refractive index material layers 4b may all be the same, or a portion or all of the layers may have different thickness values.

The thickness of each of the low refractive index material layers 4a and 4c may be, for example, at least 1 nm but not more than 200 nm. In those cases where the anti-reflective layer 4 includes two or more of the low refractive index material layers 4a and 4c, the plurality of low refractive index material layers 4a and 4c may all have the same thickness, or a portion or all of the layers may have different thickness values.

The thickness of each of the high refractive index material layers 4b may be, for example, at least 1 nm but not more than 200 nm. In those cases where the anti-reflective layer 4 includes two or more of the high refractive index material layers 4b, the plurality of high refractive index material layers 4b may all have the same thickness, or a portion or all of the layers may have different thickness values.

The thicknesses of the low refractive index material layers 4a and 4c and the high refractive index material layers 4b may be, for example, in order from the side of the hard coat layer 3, from 30 to 120 nm for the low refractive index material layer 4a, from 10 to 50 nm for the high refractive index material layer 4b, from 30 to 120 nm for the low refractive index material layer 4c, from 50 to 200 nm for the high refractive index material layer 4b, and from 50 to 200 nm for the low refractive index material layer 4c.

There are no particular limitations on the method used for producing the anti-reflective layer 4, and production may be conducted using a conventional method. For example, the anti-reflective layer 4 can be produced by using a sputtering method to form the low refractive index material layers 4a, the high refractive index material layer 4b, the low refractive index material layer 4c, the high refractive index material layer 4b, and the low refractive index material layer 4c in that order on the hard coat layer 3.

When the low refractive index material layers 4a and 4c and the high refractive index material layers 4b are formed using a sputtering method, the layers are more dense compared with those formed using a typical vacuum deposition method or coating method. As a result, a highly durable optical laminate 1 with a water vapor permeability of not more than 1.0 g/m²/day is obtained.

(Antifouling Layer)

The antifouling layer 5 is provided, as necessary, on the surface of the anti-reflective layer 4 on the opposite side from the hard coat layer 3. The antifouling layer 5 prevents fouling of the optical laminate 1, and suppresses wear of the anti-reflective layer 4.

The antifouling layer 5 is preferably a layer that contains a fluorine-based compound. For example, compounds containing a fluorine-modified organic group and a reactive silyl group such as an alkoxysilane can be used favorably as the fluorine-based compound. An example of this type of compounds is perfluorodecyltriethoxysilane (FDTS).

Examples of commercially available products that are ideal as the material for the antifouling layer 5 include OPTOOL DSX (manufactured by Daikin Industries, Ltd.) and KY-1203 (manufactured by Shin-Etsu Chemical Co., Ltd.).

If necessary, the antifouling layer 5 may also contain additives such as photostabilizers, ultraviolet absorbers, colorants, antistatic agents, lubricants, leveling agents, antifoaming agents, antioxidants, flame retardants, infrared absorbers and surfactants.

The thickness of the antifouling layer 5 may be, for example, within a range from 1 to 20 nm, and is preferably from 3 to 10 nm.

There are no particular limitations on the method used for producing the antifouling layer 5, and production may be conducted using a conventional method, which may be selected appropriately with due consideration of the required durability and the cost. Specifically, the antifouling layer 5 can be produced using a coating method or a deposition method. Examples of the coating method include a method in which a coating liquid prepared by dissolving the materials that constitute the antifouling layer 5 in a solvent is applied to the anti-reflective layer 4 using a conventional method and then dried. Further, when the antifouling layer 5 is formed by a deposition method, the layer is more dense and exhibits better adhesion to the anti-reflective layer 4 compared with, for example, an antifouling layer formed by a coating method. Accordingly, an antifouling layer 5 formed by a deposition method has superior wear resistance.

In the optical laminate 1 of the present embodiment, if necessary, one or more layers may be provided on the surface of the transparent substrate 2 on the opposite side from the anti-reflective layer 4. For example, an adhesive layer for bonding the optical laminate 1 to another members such as the surface of an image display device may be provided on the surface of the transparent substrate 2 on the opposite side from the anti-reflective layer 4, or an adhesive layer and another optical film may be laminated in that order. Examples of this other optical film include a polarizing film, a phase difference compensation film, a half wave plate, or a quarter wave plate. Further, the other optical films mentioned above may also be formed in contact with the surface of the transparent substrate 2 on the opposite side from the anti-reflective layer 4.

The optical laminate 1 of the present embodiment includes the transparent substrate 2, the hard coat layer 3 and the anti-reflective layer 4 laminates in that order, wherein the anti-reflective layer 4 is formed from a laminate having the low refractive index material layers 4a and 4c and the high refractive index material layers 4b formed from a material with a higher refractive index than the low refractive index material layers 4a and 4c laminated in an alternating arrangement. Moreover, for the optical laminate 1 of the present embodiment, the a* value and the b* value in the CIE-Lab color system of the reflected light, when light with a wavelength of 380 nm to 780 nm from a standard light source D65 is incident upon the optical laminate 1, satisfy (condition A) to (condition C) described above. According to the optical laminate 1 of the present embodiment, as a result of the synergistic effect achieved due to the optical laminate satisfying the above (condition A) to (condition C), when the optical laminate is provided on an article, reflected light reflected from the article is resistant to coloration, and color irregularity is unlikely to be visible even when the viewing angle of the article is altered.

[Article]

An article 10 of an embodiment of the present invention includes the optical laminate 1 of an embodiment of the present invention. The article 10 of the present embodiment may have the optical laminate 1 provided on the surface of an image display device 6. Examples of the image display device include flat panel displays (FPD) such as liquid crystal display panels and organic electroluminescent (EL) display panels.

Examples of the surface of the image display device 6 to which the optical laminate 1 of an embodiment of the present invention is affixed include information input terminal screens such as mobile telephone screens, smart phone screens, tablet terminal screens, personal computer displays, navigation system screens and gaming device control screens, operating screens for operational support devices in aircraft and trains and the like, and electric display boards. Among these, the image display device 6 to which the optical laminate 1 is affixed is preferably an image display device 6 that is viewed from all manner of viewing angles during use, and a navigation system screen, a mobile telephone screen, or a smart phone screen is particularly preferred.

The article 10 of the present embodiment is not limited to an article 10 where the optical laminate 1 is provided on the surface of an image display device 6. For example, the optical laminate 1 of an embodiment of the present invention may be provided on the surfaces of window glass, goggles, the light-receiving surface of solar cells, glass tables, instrument panels, optical sensors, helmet visors, mirrors, and head-mounted displays. The surface of the article 10 of the present embodiment on which the optical laminate 1 is provided may be flat or a curved surface.

Because the article 10 of the present embodiment is provided with the optical laminate 1 of an embodiment of the present invention, reflected light from the article 10 is resistant to coloration, and color irregularity is unlikely to be visible even when the viewing angle of the article 10 is altered.

In those cases where the article 10 of the present embodiment has the optical laminate 1 provided on the surface of an image display device 6, reflected light from the image display device 6 is resistant to coloration, and color irregularity is unlikely to be visible even when the viewing angle is altered, both of which are desirable.

EXAMPLES

Example 1 to Example 3, Comparative Example 1, Comparative Example 3

Using the method described below, the optical laminate 1 illustrated in FIG. 1 was produced.

First, a film with a thickness of 80 μm formed from triacetyl cellulose (TAC) was prepared as the transparent substrate 2. Subsequently, a hard coat layer 3 with a thickness of 5 μm formed from the material shown in Table 1 was formed on top of the transparent substrate 2.

TABLE 1

| | | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| Anti-reflective layer (sputtering) | $SiO_2$ (5th layer) | thickness (nm) | 81.0 | 87.5 | 84.0 | 83.3 | 72.7 | 95.0 | — | — |
| | $Nb_2O_5$ (4th layer) | thickness (nm) | 106.0 | 104.3 | 101.5 | 111.1 | 114.3 | 36.0 | — | — |
| | $SiO_2$ (3rd layer) | thickness (nm) | 34.2 | 37.0 | 30.0 | 26.7 | 25.0 | 37.0 | — | — |
| | $Nb_2O_5$ (2nd layer) | thickness (nm) | 12.0 | 10.0 | 7.7 | 13.1 | 14.3 | 17.0 | — | — |
| | $SiO_x$ (1st layer) | thickness (nm) | <5 | <5 | <5 | <5 | <5 | <5 | — | — |
| Anti-reflective layer (coating) | Low refractive index layer | thickness (nm) | — | — | — | — | — | — | 100 | 115 |
| | High refractive index layer | thickness (nm) | — | — | — | — | — | — | 4000 | 35 |
| | Mid refractive index layer | thickness (nm) | — | — | — | — | — | — | — | 125 |
| Hard coat layer | Material | | CHC | CHC | CHC | CHC | AG-HC | CHC | — | CHC |
| Chromaticity of reflected light | Incident angle 5° | a* | 1.2 | −1.8 | −5.8 | 0.9 | 2.6 | 4.0 | 4.21 | 0.92 |
| | | b* | −6.8 | −5.3 | 4.1 | −3.2 | −3.0 | −8.9 | −5.34 | −5.86 |
| | | \|a*\|/\|b*\| | 0.18 | 0.35 | 1.43 | 0.28 | 0.87 | 0.46 | 0.79 | 0.16 |
| | Incident angle 10° | a* | 1.1 | −1.6 | −5.7 | 0.7 | 2.3 | 4.5 | 4.26 | 0.64 |
| | | b* | −6.4 | −5.1 | 4.0 | −2.8 | −2.4 | −8.2 | −5.0 | −5.3 |
| | | \|a*\|/\|b*\| | 0.18 | 0.31 | 1.44 | 0.25 | 0.96 | 0.54 | 0.86 | 0.12 |
| | Incident angle 20° | a* | 0.9 | −0.6 | −4.8 | 0.2 | 0.8 | 6.5 | 4.16 | −0.13 |
| | | b* | −4.8 | −4.3 | 3.3 | −2.1 | 0.1 | −5.8 | −3.38 | −3.52 |
| | | \|a*\|/\|b*\| | 0.20 | 0.14 | 1.48 | 0.08 | 8.00 | 1.11 | 1.23 | 0.04 |
| | Incident angle 25° | a* | 0.7 | −0.1 | −3.5 | −0.3 | −0.1 | 8.2 | 4.10 | −0.55 |
| | | b* | −3.8 | −3.7 | 2.0 | −1.6 | 1.2 | −4.5 | −2.28 | −2.47 |
| | | \|a*\|/\|b*\| | 0.19 | 0.03 | 1.75 | 0.19 | 0.08 | 1.82 | 1.80 | 0.22 |
| | Incident angle 30° | a* | 0.4 | 0.7 | −2.6 | −1.0 | −1.4 | 10.8 | 3.92 | −0.81 |
| | | b* | −2.2 | −2.9 | 1.4 | −0.6 | 3.0 | −2.5 | −0.82 | −1.59 |
| | | \|a*\|/\|b*\| | 0.20 | 0.25 | 1.84 | 1.59 | 0.47 | 4.34 | 4.77 | 0.51 |
| | Incident angle 40° | a* | −0.2 | 2.4 | 2.0 | −3.0 | −4.1 | 15.8 | 3.34 | −0.21 |
| | | b* | 1.0 | −1.5 | −2.4 | 1.5 | 5.9 | 2.1 | 2.07 | −0.33 |
| | | \|a*\|/\|b*\| | 0.22 | 1.53 | 0.82 | 1.95 | 0.69 | 7.70 | 1.61 | 0.64 |
| | Incident angle 50° | a* | −0.5 | 3.5 | 6.5 | −5.3 | −3.7 | 14.1 | 2.3 | ND |
| | | b* | 2.9 | −0.8 | −5.7 | 4.3 | 14.1 | 5.2 | 5.1 | ND |
| | | \|a*\|/\|b*\| | 0.16 | 4.21 | 1.13 | 1.24 | 0.26 | 2.70 | 0.44 | ND |
| Difference between maximum and minimum values for \|a*\|/\|b*\| (5° to 30°) | | | 0.02 | 0.32 | 0.41 | 1.51 | 7.92 | 3.89 | 3.98 | 0.47 |
| Difference between maximum and minimum values for \|a*\|/\|b*\| (5° to 40°) | | | 0.04 | 1.50 | 1.02 | 1.87 | 7.92 | 7.25 | 3.98 | 0.60 |
| | Within same quadrant (5° to 25°) | | ○ | ○ | ○ | x | x | ○ | ○ | x |
| | Visual evaluation | | ○ | ○ | ○ | x | x | x | x | x |
| Martens hardness (N/mm²) | Hardness | | 3324 | 3656 | 3426 | 3637 | 3380 | 1005 | 429 | 630 |
| | Evaluation (○ indicates ≥1,000) | | ○ | ○ | ○ | ○ | ○ | ○ | x | x |
| Resistance to steel wool sliding | 1 kg load 10 times back and forth | | ○ | ○ | ○ | ○ | ○ | ○ | x | x |

In Table 1, "CHC" indicates a layer formed using a method in which a coating liquid having the composition shown in Table 2 is applied to the transparent substrate 2 using a bar coater, and the coating liquid is then cured by photopolymerization by irradiation with ultraviolet rays.

TABLE 2

| | Product name | Manu-facturer | Structure | Blend ratio |
|---|---|---|---|---|
| Ionizing radiation curable resin | CN968 | Sartomer | Hexafunctional aliphatic urethane acrylate having polyester skeleton | 8% |
| | SR444 | Sartomer | Pentaerythritol triacrylate | 7% |
| | SR610 | Sartomer | Polyethylene glycol (600) diacrylate (polyethylene glycol chain molecular weight: approximately 600) | 11% |
| Silica particles | IPA-ST-L | Nissan Chemical | Silica sol (particle size: 40 to 50 nm, solvent: IPA, solid fraction: 30%) | 37% |
| Ultraviolet curing initiator | Irgacure 184 | BASF | Hydroxycyclohexyl phenyl ketone | 2% |
| Solvent | PGMA | | Propylene glycol monomethyl ether acetate | 30% |
| | Butyl acetate | | | 5% |
| Total | | | | 100% |
| Leveling agent | BYK377 | BYK | Polyether-modified, hydroxy-functional polydimethylsiloxane | 0.01 parts by weight per 100 parts by weight of the above total |

Further, "AG-HC" in Table 1 indicates a layer formed using a method in which a coating liquid having the composition shown in Table 3 is applied to the transparent substrate 2 using a bar coater, and the coating liquid is then cured by photopolymerization by irradiation with ultraviolet rays.

TABLE 3

| | Product name | Manu-facturer | Structure | Blend ratio |
|---|---|---|---|---|
| Ionizing radiation curable resin | CN968 | Sartomer | Hexafunctional aliphatic urethane acrylate having polyester skeleton | 10% |
| | SR444 | Sartomer | Pentaerythritol triacrylate | 9% |
| | SR610 | Sartomer | Polyethylene glycol (600) diacrylate (polyethylene glycol chain molecular weight: approximately 600) | 14% |
| Organic particles | MX-300 | Soken Chemical | Average particle size: 3 μm Crosslinked acrylic monodisperse particles | 4% |
| Ultraviolet curing initiator | Irgacure 184 | BASF | Hydroxycyclohexyl phenyl ketone | 2% |

TABLE 3-continued

| | Product name | Manu-facturer | Structure | Blend ratio |
|---|---|---|---|---|
| Solvent | PGMA | | Propylene glycol monomethyl ether acetate | 30% |
| | Butyl acetate | | | 5% |
| | IPA | | Isopropyl alcohol | 26% |
| Total | | | | 100% |
| Leveling agent | BYK377 | BYK | Polyether-modified, hydroxy-functional polydimethylsiloxane | 0.01 parts by weight per 100 parts by weight of the above total |

Subsequently, using a Si target and a Nb target as sputtering targets, reactive sputtering using a mixed gas of Ar gas and $O_2$ gas was used to form an anti-reflective layer 4 (laminate) on the hard coat layer 3. In other words, a low refractive index material layer 4a (first layer) having a thickness shown in Table 1 and formed from a Si oxide that may have oxygen deficiency, a high refractive index material layer 4b (second layer) formed from $Nb_2O_5$ and having a thickness shown in Table 1, a low refractive index material layer 4c (third layer) formed from $SiO_2$ and having a thickness shown in Table 1, a high refractive index material layer 4b (fourth layer) formed from $Nb_2O_5$ and having a thickness shown in Table 1, and a low refractive index material layer 4c (fifth layer) formed from $SiO_2$ and having a thickness shown in Table 1 were deposited in that order on the hard coat layer 3.

Next, an antifouling layer 5 with a thickness of 10 nm was formed on the anti-reflective layer 4 using a method in which a coating liquid was applied to the anti-reflective layer 4 using a coil bar (product name: No. 579, No. 9 rod, manufactured by Yasuda Seiki Seisakusho, Ltd.) to achieve a coating film thickness of 10 μm, and the coating liquid was then dried at 80° C. for two minutes. The coating liquid used was a solution containing 0.1% by mass of an alkoxysilane compound having a perfluoro polyether group (product name: OPTOOL DSX, manufactured by Daikin Industries, Ltd.) in a fluorine-based solvent (product name: Fluorinert FC-3283, manufactured by 3M Japan Ltd.).

Using the steps outlined above, optical laminates of Example 1 to Example 3, Comparative Example 1 and Comparative Example 3 were produced.

Comparative Example 2

An optical laminate of Comparative Example 2 was produced by conducting all the steps up to and including the formation of the anti-reflective layer 4 in the same manner as Examples 1 to 3, Comparative Example 1 and Comparative Example 3.

Comparative Example 4

In the production of an optical laminate of Comparative Example 4, a film formed from triacetyl cellulose (TAC) having a thickness of 80 μm was prepared as the transparent substrate 2, and a high refractive index layer and a low refractive index layer were formed on the substrate using coating methods.

(High Refractive Index Layer Coating Liquid Preparation)

Dipentaerythritol hexaacrylate, isocyanuric acid EO-modified diacrylate, dimethyloltricyclodecane diacrylate, antimony pentoxide, and an initiator (1-hydroxycyclo-hexyl phenyl ketone) were dissolved in isopropyl alcohol solvent to form a solution with a solid fraction of 40% by weight, thus completing preparation of a coating liquid for a high refractive index layer. The solid fraction refers to the substances other than the solvent, and in this case, indicates the photopolymerizable prepolymers such as dipentaeryth-ritol hexaacrylate, the antimony pentoxide and the initiator.

Using a gravure method, this high refractive index layer coating liquid was applied to the surface of a transparent substrate formed from a triacetyl cellulose film (thickness: 80 μm) in an amount sufficient to achieve a dried film thickness of 4 μm, and the coating liquid was then dried for one minute and 30 seconds in an 80° C. oven, and then cured by irradiation with a 160 W high-pressure mercury lamp for 3 seconds from a distance of 18 cm, thus forming a high refractive index layer. This high refractive index layer also functions as a hard coat layer.

(Low Refractive Index Layer Coating Liquid Preparation)

In order to form a low refractive index layer, the coating liquid described below was prepared.

A low refractive index coating agent (polymerizable com-position) was produced by combining 4% by weight of a polyester acrylate oligomer, 18% by weight of pentaeryth-ritol tetraacrylate and 28.5% by weight of polyethylene glycol diacrylate with 40% by weight of hollow silica particles with an average particle size of 60 nm, 8% by weight of an α-hydroxy ketone-based initiator, and 1.5% by weight of a modified silicone compound (functional group equivalent weight: 3,900 g/mol).

The low refractive index coating agent was dissolved and dispersed in n-butanol solvent to produce a low refractive index layer coating liquid with a solid fraction (the low refractive index coating agent) of 3.0% by weight.

Using a gravure method, the low refractive index layer coating liquid was applied to the surface of the high refrac-tive index layer in an amount sufficient to form a coating layer with a dried film thickness of 100 nm, and following drying for one minute and 30 seconds in an 80° C. oven, the coating layer was cured, under a nitrogen atmosphere (oxy-gen concentration: 1,000 ppm), by irradiation with a 160 W high-pressure mercury lamp for 3 seconds from a distance of 18 cm, thus forming a low refractive index layer and completing the anti-reflective film of Comparative Example 4.

Comparative Example 5

An optical laminate of Comparative Example 5 was obtained using the production method disclosed in Japanese Unexamined Patent Application, First Publication No. 2019-70756.

[Measurement of Chromaticity of Reflected Light]

Using each of the optical laminates of Examples 1 to 3 and Comparative Examples 1 to 5 obtained in the manner described above, an acrylic-based transparent adhesive was used to bond a black acrylic panel to the surface of the optical laminate on the side of the transparent substrate 2, thus preparing a test piece for which rear surface reflection was removed. Using a V-550 device manufactured by JASCO Corporation, light from a standard light source D65 with a wavelength of 380 nm to 780 nm was irradiated onto the surface of each optical laminate at an incident angle of 5° from the surface of the optical laminate on the opposite side from the transparent substrate 2, and using calculation formulas, the chromaticity of the reflected light was calcu-lated from the reflected spectrum. The a* value and the b* value in the CIE-Lab color system were calculated as the chromaticity. The results are shown in Table 1. Further, the results for Example 1 to Example 3 and Comparative Example 1 to Comparative Example 3 are also shown in FIG. 3 and FIG. 4.

Furthermore, for the test piece of each of the optical laminates, a similar method to that described above for when light was incident on the surface of the optical laminate at an incident angle of 5° was used to irradiate light onto the optical laminate at incident angles of 10°, 20°, 25°, 30°, 40° and 50°, and the chromaticity of the reflected light was calculated in each case. The results are shown in Table 1. Further, the results for Example 1 to Example 3 and Com-parative Example 1 to Comparative Example 3 are also shown in FIG. 3 and FIG. 4.

Figure 3:
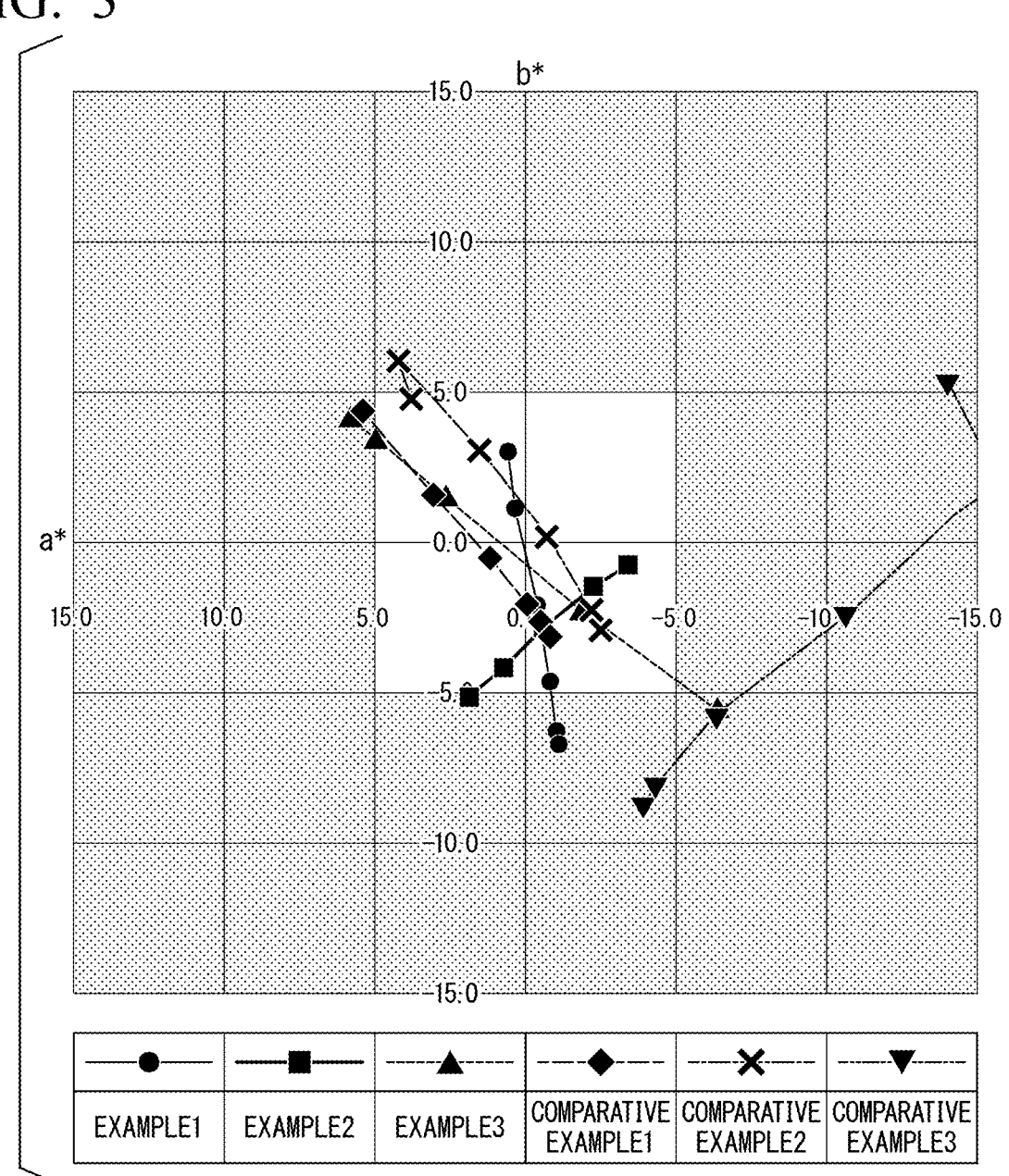
FIG. 3 is a graph illustrating the chromaticity of reflected light when light is incident on the surface of each of the optical laminates of Example 1 to Example 3 and Comparative Example 1 to Comparative Example 3 at incident angles of 5°, 10°, 20°, 30°, 40° and 50°.
Figure 4:
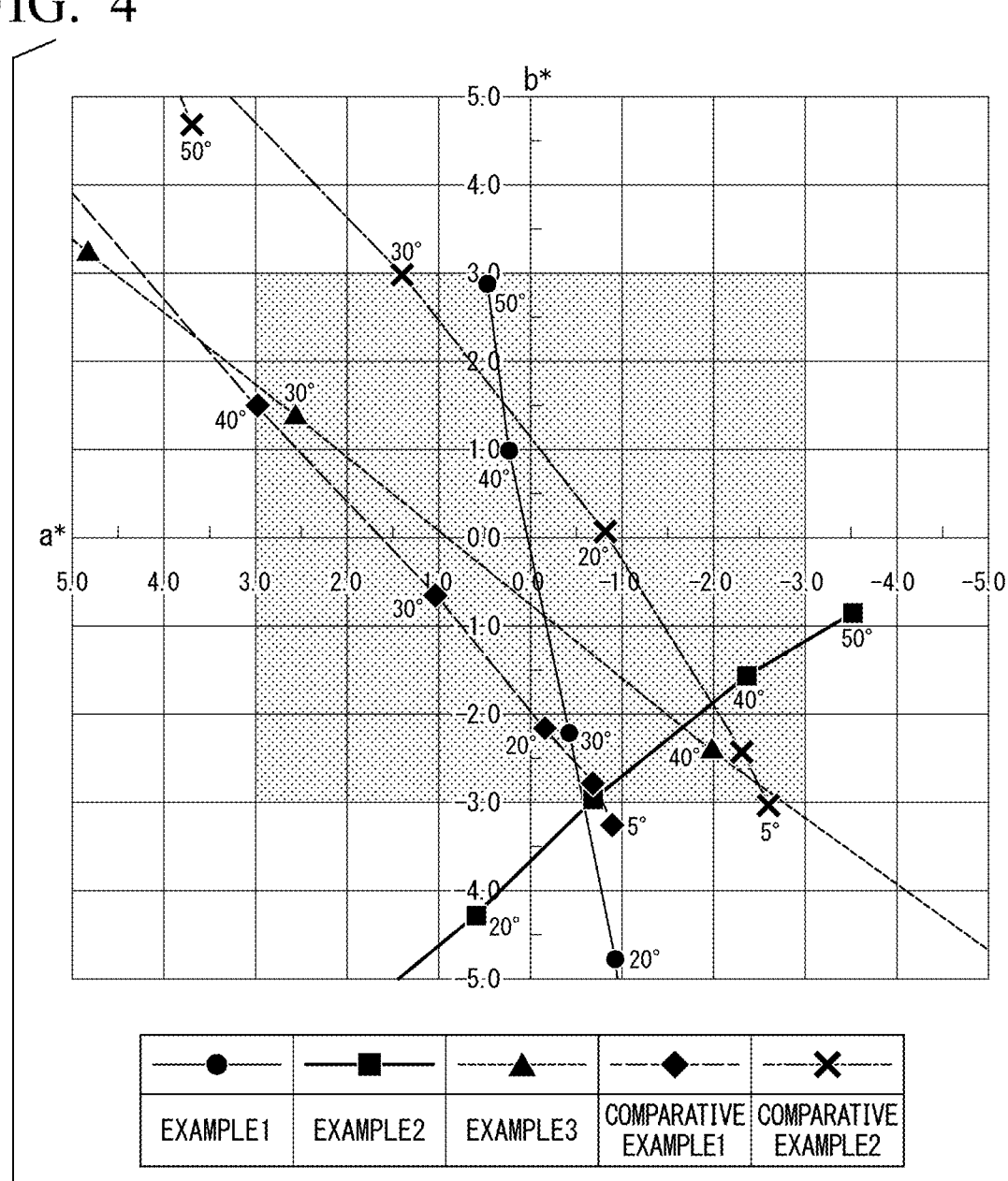
FIG. 4 is a graph illustrating an enlargement of the central portion of the graph of FIG. 3.

FIG. 3 is a graph illustrating the chromaticity of the reflected light when light was incident on the surface of each of the optical laminates of Example 1 to Example 3 and Comparative Example 1 to Comparative Example 3 at incident angles of 5°, 10°, 20°, 30°, 40° and 50°. FIG. 4 is a graph illustrating an enlargement of the central portion of the graph of FIG. 3. In FIG. 4, the number recorded near each of the coordinate points indicates the incident angle (°) corresponding with that coordinate point.

Further, for the optical laminate of each of Example 1 to Example 3 and Comparative Example 1 to Comparative Example 5, the value of $|a*|/|b*|$ was calculated for each incident angle, and the difference between the maximum value and the minimum value for $|a*|/|b*|$ when light was incident at incident angles of 5°, 10°, 20°, 25° and 30°, and the difference between the maximum value and the mini-mum value for $|a*|/|b*|$ when light was incident at incident angles of 5°, 10°, 20°, 25°, 30° and 40° were determined. The results are shown in Table 1.

Furthermore, confirmation was made as to whether or not the a* value and b* value in the CIE-Lab color system for the reflected light changed quadrants when light was inci-dent at incident angles from 5° to 25°, or in other words, whether or not the values remained within the same quad-rant, and this property was then evaluated using the follow-ing criteria. Namely, an evaluation of "o" means little change in the color, whereas an evaluation of "×" means a comparatively larger color change.

[Criteria]
    o: values remain within the same quadrant
    ×: values do not remain within the same quadrant

[Evaluation of Hue of Reflected Light]

Using the test pieces of the optical laminates of Example 1, Comparative Example 2 and Comparative Example 3 used in measuring the chromaticity of the reflected light, the color of each test piece was photographed when the light described above was incident on the surface of the optical laminate at incident angles of 5°, 10°, 20°, 30° and 40°.

Figure 5:
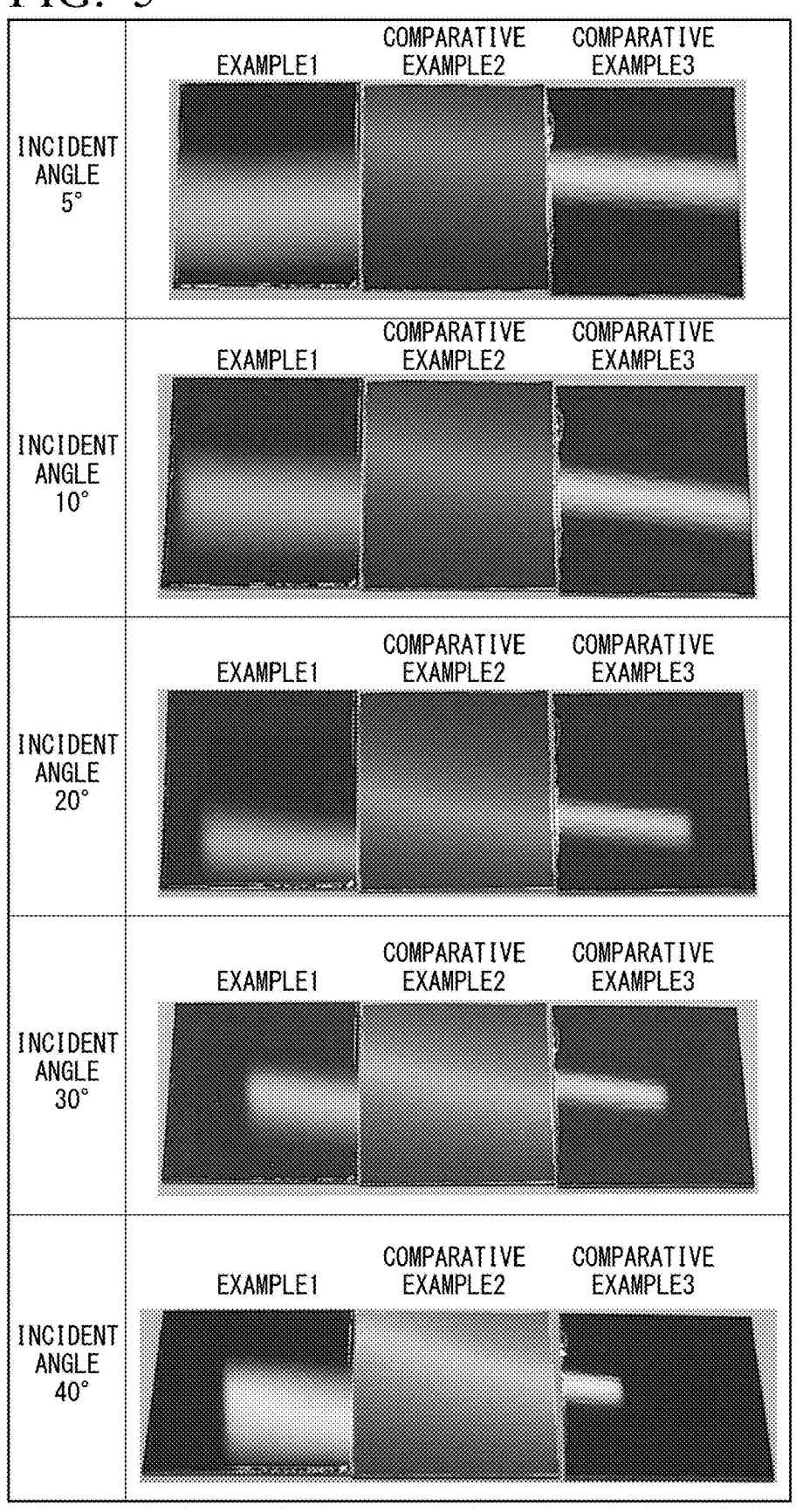
FIG. 5 is a series of photographs of test pieces when light is incident upon the surface of each of various optical laminates at incident angles of 5°, 10°, 20°, 30° and 40°.
Figure 6:
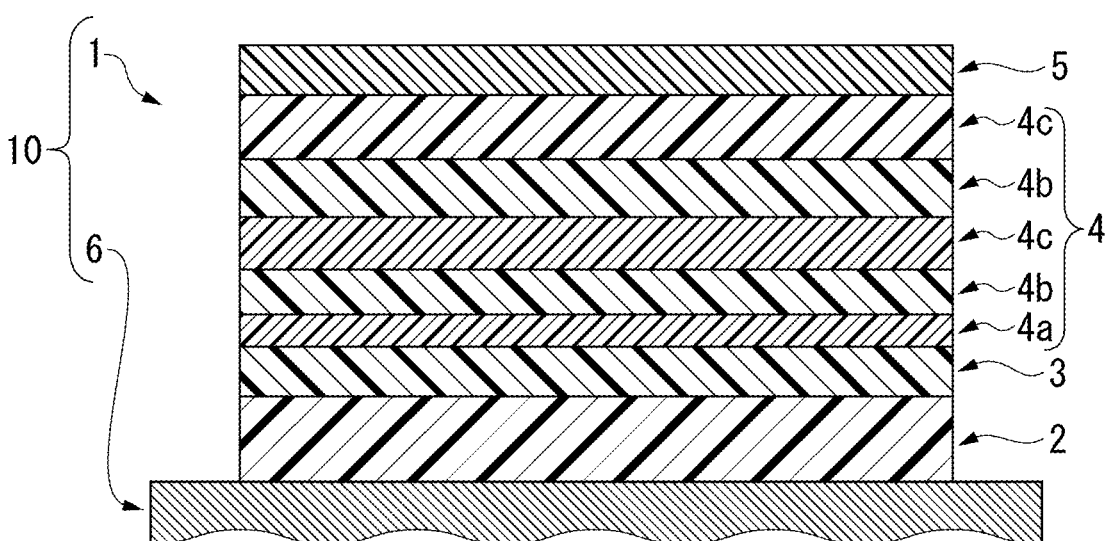
FIG. 6 is a cross-sectional schematic view illustrating one example of an article of the present invention.

FIG. 5 is a series of photographs of each of the test pieces when light was incident on the surface of the optical laminates of Example 1, Comparative Example 2 and Com-parative Example 3 at incident angles of 5°, 10°, 20°, 30° and 40°.

Further, for each of the test pieces of the optical laminates of Example 1 to Example 3 and Comparative Example 1 to Comparative Example 3 used in measuring the chromaticity of the reflected light, the optical laminate was viewed from the surface of the optical laminate on the opposite side from the transparent substrate 2 while the viewing angle was changed, and an evaluation was awarded based on the following criteria.

[Criteria]

◯: no change in the hue (color tendency) is visible

×: change in the hue (color tendency) is clearly visible

[Measurement of Martens Hardness]

Using a PICODENTER HM-500 and a Vickers indenter manufactured by Fischer Technology Inc., the Martens hardness was measured under a press load of 0.1 mN. The hardness was then evaluated against the following criteria.

[Criteria]

◯: 1,000 (N/mm$^2$) or greater

×: less than 1,000 (N/mm$^2$)

[Testing of Resistance to Steel Wool Sliding]

Using a friction tester type I prescribed in HS L0849, test pieces were obtained by moving a friction body horizontally back and forth across the surface of the optical laminates (test pieces) of Example 1 and Comparative Example 2.

A steel wool (number #0000, manufactured by BON-STAR Co., Ltd.) was used as the friction body. The test settings involved determining whether or not scratches were formed when the steel wool (SW) was slid 10 times back and forth across the surface of the optical laminate with a load of 1,000 g/cm$^2$, a stroke of 75 mm and a speed of 150 mm/s. The resistance was then evaluated against the following criteria.

◯: no scratches were formed

×: scratches were formed

As shown in Table 1, FIG. 3 and FIG. 4, the optical laminates of Example 1 to Example 3 which satisfy (condition A) to (condition D) described above exhibited little hue change in the reflected light when the light was incident at an incident angle of 5° to 40°. Further, based on Table 1, FIG. 3 and FIG. 4, it was also confirmed that for the optical laminates of Example 1 to Example 3, the reflected light, when the light was incident continuously at incident angles from 5° to 40°, had a similar hue, and exhibited a tendency for the saturation to decrease as the incident angle increased. Furthermore, as shown in Table 1, the optical laminates of Example 1 to Example 3 each had a visual evaluation result of "◯".

Moreover, in addition to satisfying (condition A) to (condition D), Examples 1 to 3 also satisfy (condition E). In other words, in Examples 1 to 3, the a* value and the b* value in the CIE-Lab color system of the reflected light, when light is incident at an incident angle of 5° to 25°, do not change to a different quadrant, but rather remain within the same quadrant. This property indicates that, for example, in those cases where a display device provided with an optical laminate of Examples 1 to 3 is provided on the center console or the like in an automobile, or provided in the ceiling forward of a rear seat, there is little color change when viewed from the rear seat, making the optical laminate ideal for these types of applications.

In contrast, as shown in Table 1, FIG. 3 and FIG. 4, in the case of the optical laminates of Comparative Example 1 to Comparative Example 3, which do not satisfy one or more of the above (condition A) to (condition C), the hue change in the reflected light, when light was incident at an incident angle of 5° to 40°, was larger than that observed for the optical laminates of Example 1 to Example 3. Further, as shown in Table 1, the optical laminates of Comparative Example 1 to Comparative Example 3 each had a visual evaluation result of "×".

In addition, Comparative Example 2 and Comparative Example 5 also do not satisfy (condition E), and in those cases where a display device provided with an optical laminate of Comparative Example 2 or Comparative Example 5 is provided on the center console or the like in an automobile, or provided in the ceiling forward of a rear seat, the color change when viewed from the rear seat is large, meaning the optical laminate is not as suitable for these types of applications compared with the optical laminates of Examples 1 to 3.

As illustrated in FIG. 5, with the optical laminate of Example 1, when the viewing angle was altered from an incident angle of 5° to 20°, although a change in the blue hue was observed, the saturation decreased as the incident angle was increased. Further, with the optical laminate of Example 1, at incident angles of 30° and 40°, the reflected light was substantially achromatic.

In contrast, in the case of the optical laminate of Comparative Example 2, as illustrated in FIG. 5, a violet hue was observed at incident angles of 5° and 10°, a yellow-green hue was observed at incident angles of 20° and 30°, and a green hue was observed at an incident angle of 40°. In other words, with the optical laminate of Comparative Example 2, the hue of the color observed differed for incident angles of 5° and 10°, incident angles of 20° and 30°, and an incident angle of 40°.

Furthermore, in the case of the optical laminate of Comparative Example 3, a blue hue was observed at incident angles of 5° and 10°, a violet hue was observed at an incident angle of 20°, and a reddish violet hue was observed at incident angles of 30° and 40°. In other words, with the optical laminate of Comparative Example 3, the hue of the color observed differed for incident angles of 5° and 10°, an incident angle of 20°, and incident angles of 30° and 40°.

Based on the results of the Martens hardness measurements, it was evident that compared with Examples 1 to 3 and Comparative Examples 1 to 3 in which the anti-reflective layer was produced by sputtering, and an antifouling layer was then formed on top of the anti-reflective layer to complete the optical laminate, Comparative Example 4 and Comparative Example 5 in which the anti-reflective layer was produced by a coating method to obtain the optical laminate exhibited markedly reduced hardness.

This is because by forming an inorganic thin film by sputtering, a film is formed that is more dense and harder than that obtained by a coating method.

Based on the results of the testing of resistance to steel wool sliding, it was evident that in Comparative Example 4 and Comparative Example 5, the steel wool sliding resistance was inferior compared with that observed for Examples 1 to 3 and Comparative Examples 1 to 3.

DESCRIPTION OF THE REFERENCE SIGNS

1: Optical laminate

2: Transparent substrate

3: Hard coat layer

4: Anti-reflective layer

4a, 4c: Low refractive index material layer

4b: High refractive index material layer

5: Antifouling layer

The invention claimed is:

1. An optical laminate comprising a transparent substrate, a hard coat layer and an anti-reflective layer laminated in that order, wherein the anti-reflective layer is a laminate having a low refractive index material layer and a high refractive index material layer formed from a material with a higher refractive index than the low refractive index material layer laminated in an alternating arrangement, wherein the anti-reflective layer includes at least a first high refractive index material layer, the low refractive index material layer, and a second high refractive index material layer, which are laminated in this order from a side of the hard coat layer, wherein a thickness of the first high refractive index material layer is 7.7 nm or more and 12.0 nm or less, a thickness of the low refractive index material layer is 30 nm or more and 120 nm or less, a thickness of the second high refractive index material layer is 50 nm or more and 106.0 nm or less wherein when a light with a wavelength of 380 nm to 780 nm from a standard light source D65 is incident upon the optical laminate, an a* value and a b* value in a CIE-Lab color system of a reflected light satisfy (condition A) to (condition C) and (condition E) described below, wherein the anti-reflective layer is a sputtered layer, and wherein:

(Condition A) when the light is incident at an incident angle of 30° to 40° relative to a surface of the optical laminate, the a* value and the b* value of the reflected light each have an absolute value of not more than 3;

(Condition B) when the light is incident at incident angles of 5°, 10°, 20° and 30° relative to the surface of the optical laminate, the a* values and the b* values of the reflected light satisfy formula (B1) shown below:

$$\{\text{maximum value of } (|a*|/|b*|)\}-\{\text{minimum value of } (|a*|/|b*|)\}<1.0 \tag{B1};$$

(Condition C) when the light is incident at an incident angle of 5° relative to the surface of the optical laminate, one or both of the a* value and the b* value of the reflected light have an absolute value of 5 or greater, and the a* value and the b* value have absolute values of not more than 15; and (Condition E) when the light is incident at an incident angle of 5° to 25°, the a* value and the b* value in the CIE-Lab color system of the reflected light are within a same quadrant in an a*b* plane.

2. The optical laminate according to claim 1, wherein when the light is incident upon the optical laminate, the a* value and the b* value in the CIE-Lab color system of the reflected light satisfy (condition D) shown below:

(Condition D) when the light is incident at incident angles of 5°, 10°, 20°, 30° and 40° relative to the surface of the optical laminate, the a* values and the b* values of the reflected light satisfy formula (D1) shown below:

$$\{\text{maximum value of } (|a*|/|b*|)\}-\{\text{minimum value of } (|a*|/|b*|)\}<1.5 \tag{D1}.$$

3. The optical laminate according to claim 2, wherein in (condition D), when the light is incident at incident angles of 5°, 10°, 20°, 30° and 40° relative to the surface of the optical laminate, the a* values and the b* values of the reflected light satisfy formula (D2) shown below:

$$\{\text{maximum value of } (|a*|/|b*|)\}-\{\text{minimum value of } (|a*|/|b*|)\}<1.0 \tag{D2}.$$

4. The optical laminate according to claim 2, wherein in (condition D), when the light is incident at incident angles of 5°, 10°, 20°, 30° and 40° relative to the surface of the optical laminate, the a* values and the b* values of the reflected light satisfy formula (D3) shown below:

$$\{\text{maximum value of } (|a*|/|b*|)\}-\{\text{minimum value of } (|a*|/|b*|)\}<0.1 \tag{D3}.$$

5. The optical laminate according to claim 1, wherein the low refractive index material layer contains a Si oxide, and the high refractive index material layer is formed from $Nb_2O_5$.

6. The optical laminate according to claim 1, wherein an antifouling layer is laminated to a surface of the anti-reflective layer on an opposite side from the hard coat layer.

7. The optical laminate according to claim 6, wherein the antifouling layer contains a fluorine-based compound, and is formed by a vapor deposition method or a coating method.

8. The optical laminate according to claim 1, wherein the transparent substrate is composed of a plastic film which has 80% or higher of a transmittance of light in a visible light region and a thickness of 25 μm or more and 80 μm or less.

9. The optical laminate according to claim 1, wherein the hard coat layer includes a binder resin including a transparent material and a filler, and the filler includes one or more of silica particles, alumina particles, or organic fine particles.

10. An article comprising:
the optical laminate according to claim 1; and
an image display device, wherein the optical laminate is provided on a surface of the image display device.

11. An article comprising:
the optical laminate according to claim 1; and
a device selected from a group consisting of a glass, goggles, solar cells, glass tables, instrument panels, optical sensors, helmet visors, mirrors, and head-mounted displays, wherein the optical laminate is provided on a surface of the device.

* * * * *